United States Patent Office 3,689,214
Patented Sept. 5, 1972

3,689,214
PROCESS FOR THE PREPARATION OF ALKALI METAL TRICHROMATES ME I CR3O8
Henning Erfurth and Manfred Mansmann, Krefeld, Germany, assignors to Farbenfabriken Bayer Aktiengesellschaft, Leverkusen, Germany
No Drawing. Filed Oct. 19, 1970, Ser. No. 82,085
Claims priority, application Germany, Nov. 6, 1969,
P 19 55 895.3
Int. Cl. C01g 37/14
U.S. Cl. 423—596
6 Claims

ABSTRACT OF THE DISCLOSURE

Production of alkali metal trichromate $Me^ICr_3O_8$ by reacting a melt of at least one alkali metal dichromate with a proton donor compound at a temperature of between 250 and 500° C., separating the unreacted dichromate from the reaction mixture, washing and drying the trichromate containing residue.

---

The invention relates to a process for the preparation of alkali metal trichlorates $Me^ICr_3O_8$ in which the chromium has an average valency of +5. The compounds are insoluble in water and can be used as rust preventing and black pigments. They may also be used as starting material for the preparation of ferromagnetic chromium dioxide according to U.S. Pat. 3,423,320.

Alkali metal trichromates having the composition $Me^ICr_3O_8$ were prepared for the first time by L. Suchow, J. Fankuchen and R. Ward as described in J. Am. Soc., 74 (1952), pages 1678–1679. The compounds are black in appearance, have a metallic gloss and are insoluble in water. They dissolve in hot 60% perchloric acid. The lithium compound crystallises to form ortho-rhombic crystals whereas the sodium, potassium and rubidium compounds form monoclinic crystals. The caesium compound has a different, as yet unknown structure. The average valency of the chromium is +5. X-ray diffraction patterns show that the lattice unit which has two formula units $Me^ICr_3O_8$ contains four chromium atoms which have different positions from the other chromium atoms. It is assumed that the first mentioned chromium atoms have a valency of +6 and the remaining chromium atoms a valency of +3.

The known processes for the preparation of $Me^ICr_3O_8$ start with $CrO_3$ or a mixture of $CrO_3$ and $Cr_2O_3$, and this starting material is reacted with the appropriate alkali metal dichromate at a temperature of 350° C. o 400° C. The disadvantages of these methods lie in the low volume/time yields and the high cost of chromium trioxide.

A process for the preparation of alkali metal trichromates $Me^ICr_3O_8$ has now been found which is characterised in that the melt of at least one alkali metal dichromate is reacted with a proton donor compound at a temperature of 250° C. to 500° C.

A proton donor compound within the meaning of this invention is a compound which is capable of forming protons with water with the exception of chromium compounds. The proton donor compounds used are acids, acid anhydrides or acid halides or mixtures thereof. The acids used may be e.g. HCl, $H_2SO_4$, $H_3PO_4$ and other inorganic acids. If an acid is used in its vapour form, water vapour may be used as carrier gas. The water content may vary within wide limits but acids which have a water content of more than 95% are not economical. Preferably, gaseous HCl is introduced into the melt. Suitable acid anhydrides and halides are e.g. $SO_2$, $SO_3$, $P_2O_5$ and $POCl_3$. The proton donor compounds may be introduced into the melt in the form of a dilution with an inert gas.

The alkali metal dichromates used may be dichromates of lithium, sodium, potassium, rubidium or caesium or mixtures thereof. The reaction mixture should preferably be stirred during the reaction. When the reaction is complete, the melt is treated with water and the residue is separated from the liquid by known methods and dried. An anthracite coloured, finely crystallised powder which has a metallic gloss results.

If desired, the melt may be removed in the liquid state from the solid product after the reaction and the filtrate may be used again after the addition of fresh dichromate. Working up of the residue is carried out as just described.

The reaction of the dichromate with the proton donor compounds is generally carried out at a temperature of 250° C. to 500° C., depending on the composition of the dichromate melt. Temperatures of between 300° C. and 400° C. are preferably employed.

In contrast to the process according to U.S. patent specification 3,423,320, the process according to the invention does not require any expensive chromium oxides apart from dichromate but only a proton donor compound as an additional starting material. In the preferred embodiment of the process, the compound used for this purpose is gaseous hydrogen chloride which can be obtained inexpensively in large quantities, e.g. as the by-product of organic chlorination processes, and need not be dried before it is used for the invention but can be used in the water containing form.

The process according to the invention is now described with the aid of the following examples.

EXAMPLE 1

A stream of gaseous HCl was introduced at the rate of 5 litres per hour and at a temperature of 360° C. into a melt of 143.4 g. of $Na_2Cr_2O_7$ and 56.6 g. of $K_2Cr_2O$, with stirring, and the reaction was stopped after 60 minutes. Unreacted dichromate was dissolved out of the reaction mixture with distilled water, and the water-insoluble residue was washed with distilled water and dried at 110° C. The yield was 3.5 g. of $NaCr_3O_8$. The X-ray diffractometer pattern did not show any reflections other than $NaCr_3O_8$. When viewed under an optical microscope, the preparation was found to consist of small hexagonal platelets having a diameter of less than 10μ.

EXAMPLE 2

200 g. of molten $Na_2Cr_2O_7$ were treated as in Example 1 with 5 litres of gaseous HCl per hour at 365° C. and filtered in the molten state through a glass frit after one hour's reaction. The black residue which contained some dichromate was treated as in Example 1. The yield was 20.5 g. of $NaCr_3O_8$.

What is claimed is:
1. A process for producing alkali metal trichromate which comprises contacting molten alkali metal dichromate with hydrogen chloride at a temperature between 250 and 500° C. and recovering resulting alkali metal trichromate.
2. The process of claim 1 wherein the alkali metal dichromate is sodium dichromate, potassium dichromate or a mixture thereof.
3. The process of claim 2 wherein the alkali metal dichromate is an eutectic mixture of sodium and potassium dichromates wherein the proportion by weight of $Na_2Cr_2O_7:K_2Cr_2O_7$ is 2.53:1.
4. The process of claim 1 wherein said hydrogen chloride is diluted with an inert gas.

5. The process of claim 1 wherein said temperature is between 300 and 400° C.

6. The process of claim 1 wherein said alkali metal trichromate is recovered by removing unreacted alkali metal dichromate from the reaction mixture.

References Cited

UNITED STATES PATENTS 3,423,320   1/1969   Balthis _____ 23—56
3,450,491   6/1969   Balthis.

OTHER REFERENCES

Mergault et al.: "Comp. Rendus," vol. 260, 1965, pp. 125–127.

Slinkin et al.: "Doklady Akademic Nauk., SSSR," vol. 150, May 1963, pp. 328–330.

Suchow et al.: "Journal of the American Chemical Society," vol. 74, 1952, pp. 1678–1679.

Wilhelmi: "Acta Chemica Scandinavica," vol. 12, 1958, pp. 1965–1976.

HERBERT T. CARTER, Primary Examiner